United States Patent
Lu

(10) Patent No.: US 6,466,902 B1
(45) Date of Patent: Oct. 15, 2002

(54) METHOD AND APPARATUS FOR DICTIONARY SORTING

(75) Inventor: Ning Lu, Mountain View, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/222,238

(22) Filed: Dec. 28, 1998

(51) Int. Cl.⁷ .......................... G06F 17/27; G06F 17/30
(52) U.S. Cl. ................... 704/9; 707/7; 704/10
(58) Field of Search .............. 704/1, 9, 10; 707/1, 707/7, 530, 531, 532

(56) References Cited

U.S. PATENT DOCUMENTS

| | | | |
|---|---|---|---|
| 4,295,206 A | * 10/1981 | Caid et al. ..................... | 704/1 |
| 5,371,673 A | * 12/1994 | Fan ................................. | 704/9 |
| 5,551,018 A | * 8/1996 | Hansen .......................... | 704/1 |
| 5,675,818 A | * 10/1997 | Kennedy ....................... | 704/8 |
| 5,787,426 A | * 7/1998 | Koshiba et al. ................ | 707/7 |
| 5,937,422 A | * 8/1999 | Nelson et al. .............. | 707/531 |

* cited by examiner

Primary Examiner—Patrick N. Edouard
(74) Attorney, Agent, or Firm—Blakely, Sokoloff, Taylor & Zafman LLP

(57) ABSTRACT

A method and an apparatus for sorting is disclosed. This method of sorting is adapted to sorting textual data in an efficient manner, but could be applied to other types of data with similarly satisfactory results. The method breaks marked data items to be sorted down into groups, each group sorted relative to other groups, and then sorts those subgroups as necessary, thereby minimizing comparisons and swapping.

19 Claims, 8 Drawing Sheets

```
Doc: THIS IS ONE OF SOME SIMPLE SAMPLES NEVER GIVEN BEFORE.
Mark:^         ^ ^     ^ ^   ^       ^ ^
      0         2 3     4 5   6       7 8
      1

Step 0: Order = {0,1,2,3,4,5,6,7,8},    Group {(0,8)}

... D E F G H I J ... L M N O P Q R S T U V W ...
1-a:    Count    = {...  0 0 0 0 0 2 0 ...  0 3 0 0 0 0 1 1 0 2 0 ...}
1-b:    NewGrHead = {...  0 0 0 0 0 2 ...   2 2 5 5 5 5 5 6 7 7 9 ...}
1-b:    NewGrTail = {...  0 0 0 0 0 2 2 ... 2 5 5 5 5 5 5 6 7 7 9 9 ...}
1-c:    NewOrder = {1,7,3,4,5,2,0,6,8}
1-d:    Group = {( 0,1) , (2,4) , (7,8)}

... D E F G H I J ... L M N O P Q R S T U V W ...
2-a-0:  Count    = {...  0 0 0 0 0 0 0 ...  0 0 0 0 0 0 1 0 0 1 0 ...}
2-b-0:  NewGrHead = {...  0 0 1 1 1 1 1 ... 0 0 0 0 0 0 0 1 1 1 2 ...}
2-b-0:  NewGrTail = {...  0 1 1 1 1 1 1 ... 0 0 0 0 0 0 1 1 1 2 2 ...}
2-c-0:  NewOrder = {1,7,3,4,5,2,0,6,8}

2-a-1:  Count    = {...  0 1 0 0 0 0 0 ...  0 0 0 0 2 0 0 ...}
2-b-1:  NewGrHead = {...  0 0 1 1 1 1 1 ... 1 1 1 1 1 3 3 ...}
2-b-1:  NewGrTail = {...  0 1 1 1 1 1 1 ... 1 1 1 1 3 3 3 ...}
2-c-1:  NewOrder = {1,7,3,4,5,2,0,6,8}
```

Fig. 4A 2-a-2:  Count    = {...0 2 0...}
2-b-2:  NewGrHead = {...0 0 2...}
        NewGrTail = {...0 0 2...}
2-c-2:  NewOrder = {1,7,3,4,5,2,0,6,8}
2-d:    Group = {(3,4), (7,8)}

Similarly, 3-c-0:  NewOrder = {1,7,3,4,5,2,0,6,8}
3-c-1:  NewOrder = {1,7,3,4,5,2,0,8,6}
3-d:    Group = {(3,4)}
4-c-0:  NewOrder = {1,7,3,4,5,2,0,6,8}
4-d:    Group = {(3,4)}
5-c-0:  NewOrder = {1,7,3,5,4,2,0,6,8}
5-d:    Group = { }

Fig. 4B

| Step 0 | Unsorted | |
|---|---|---|
| Mark 0 | THIS IS | X |
| 1 | IS ONE O | X |
| 2 | SOME SI | X |
| 3 | ME SIMPL | X |
| 4 | MPLE SA | X |
| 5 | MPLES N | X |
| 6 | VER GIV | X |
| 7 | IVEN BE | X |
| 8 | VEN BEF | X |

| Step 1 | Sorting on the first character | |
|---|---|---|
| Mark 1 | IS ONE O | X |
| 7 | IVEN BE | X |
| 3 | ME SIMPL | X |
| 4 | MPLE SA | X |
| 5 | MPLES N | X |
| 2 | SOME SI | |
| 0 | THIS IS | |
| 6 | VER GIV | X |
| 8 | VEN BEF | X |

| Step 2 | Sorting on the second character | |
|---|---|---|
| Mark 1 | IS ONE O | |
| 7 | IVEN BE | |
| 3 | ME SIMPL | X |
| 4 | MPLE SA | X |
| 5 | MPLES N | X |
| 2 | SOME SI | |
| 0 | THIS IS | |
| 6 | VER GIV | X |
| 8 | VEN BEF | X |

| Step 3 | Sorting on the third character | |
|---|---|---|
| Mark 1 | IS ONE O | |
| 7 | IVEN BE | |
| 3 | ME SIMPL | |
| 4 | MPLE SA | X |
| 5 | MPLES N | X |
| 2 | SOME SI | |
| 0 | THIS IS | |
| 6 | VEN BEF | |
| 8 | VER GIV | |

| Step 4 | Sorting on the fourth character | |
|---|---|---|
| Mark 1 | IS ONE O | |
| 7 | IVEN BE | |
| 3 | ME SIMPL | |
| 4 | MPLE SA | X |
| 5 | MPLES N | X |
| 2 | SOME SI | |
| 0 | THIS IS | |
| 6 | VEN BEF | |
| 8 | VER GIV | |

| Step 5 | Sorting on the fifth character | |
|---|---|---|
| Mark 1 | IS ONE O | |
| 7 | IVEN BE | |
| 3 | ME SIMPL | |
| 4 | MPLES N | |
| 5 | MPLE SA | |
| 2 | SOME SI | |
| 0 | THIS IS | |
| 6 | VEN BEF | |
| 8 | VER GIV | |

Fig. 5

METHOD AND APPARATUS FOR DICTIONARY SORTING

BACKGROUND OF THE INVENTION

1. Field of the Invention

The invention generally relates to the field of data processing and more particularly to dictionary sorting of data.

2. Background Information

Sorting in general is well developed and optimized for putting a sequence of numbers into increasing or decreasing numerical order. See for instance Numerical Recipes in C, Chapter 8 (Sorting), (WILLIAM H. PRESS, et al., NUMERICAL RECIPES IN C, Cambridge University Press, 1988). Sorting routines for use in sorting other forms of data are often derived from the routines developed for sorting numbers. However, routines thus derived typically do not give the optimal solutions to the problems associated with sorting non-numeric data. Non-numeric data typically has special characteristics that make it poorly suited for use with routines derived from numerical sorting routines.

For example, textual data is formed in characters, and an often used sorting order for textual data is dictionary order. When two words or sentences are compared, the first characters of each word are compared first, then the second characters of each word are compared if the first characters were the same, and so forth. Thus, one comparison of text is constructed of several numerical comparisons. What is needed is a method of sorting that takes advantage of the characteristics of textual data.

Moreover, dictionary sorting is an integral part of the Burrows-Wheeler transform as described by Burrows and Wheeler, (M. Burrows and D. J. Wheeler, *A Block-sorting Lossless Data Compression Algorithm*, Digital Systems Research Center Research Report 124, http://gatekeeper.dec.com/pub/DEC/SRC/research-reports/abstracts/src-rr-124.html). Implementing this transform efficiently requires use of a method of sorting that is close to optimum for dictionary sorting of text. Thus, what is needed is a more optimal method of sorting textual data than the methods derived from methods of sorting numerical data.

SUMMARY OF THE INVENTION

The invention involves a method of sorting a text document, the text document composed of a sequence of characters. The method comprises counting each character of the sequence of characters pointed to by a marker. The method further comprises sorting markers for each character into a set of groups, each group corresponding to a distinct value of the characters in the sequence of characters, the groups created based on the count of each distinct value of the characters in the sequence of characters. The method further comprises repeating for each group of the set of groups containing more than one marker, counting each character following the character previously counted for that marker, and sorting the markers within each group into further groups of the set of groups, each further group of the set of groups corresponding to a distinct value of the characters in the sequence of characters, each further group of the set of groups created based on the count of each distinct value of the characters in the sequence of characters, until no group contains more than one marker.

BRIEF DESCRIPTION OF THE DRAWINGS

The present invention is illustrated by way of example and not limitation in the accompanying figures.

FIG. 4 is an illustration of the contents of memory at various stages of the practice of one embodiment of the present invention.

FIG. 5 is the first seven letters of each Marked section of text as sorted after each of the stages displayed in FIG. 4.

DETAILED DESCRIPTION

While the following description includes specific embodiments, the present invention is understood to not be limited to these embodiments, and these embodiments may be understood by way of example rather than limitation. In particular, the present invention can be expanded to sort different types of data, including but not limited to textual data, data organized as databases, and other data organized into discrete units, and still be understood to be within the spirit and scope of the present invention.

Figure 1:
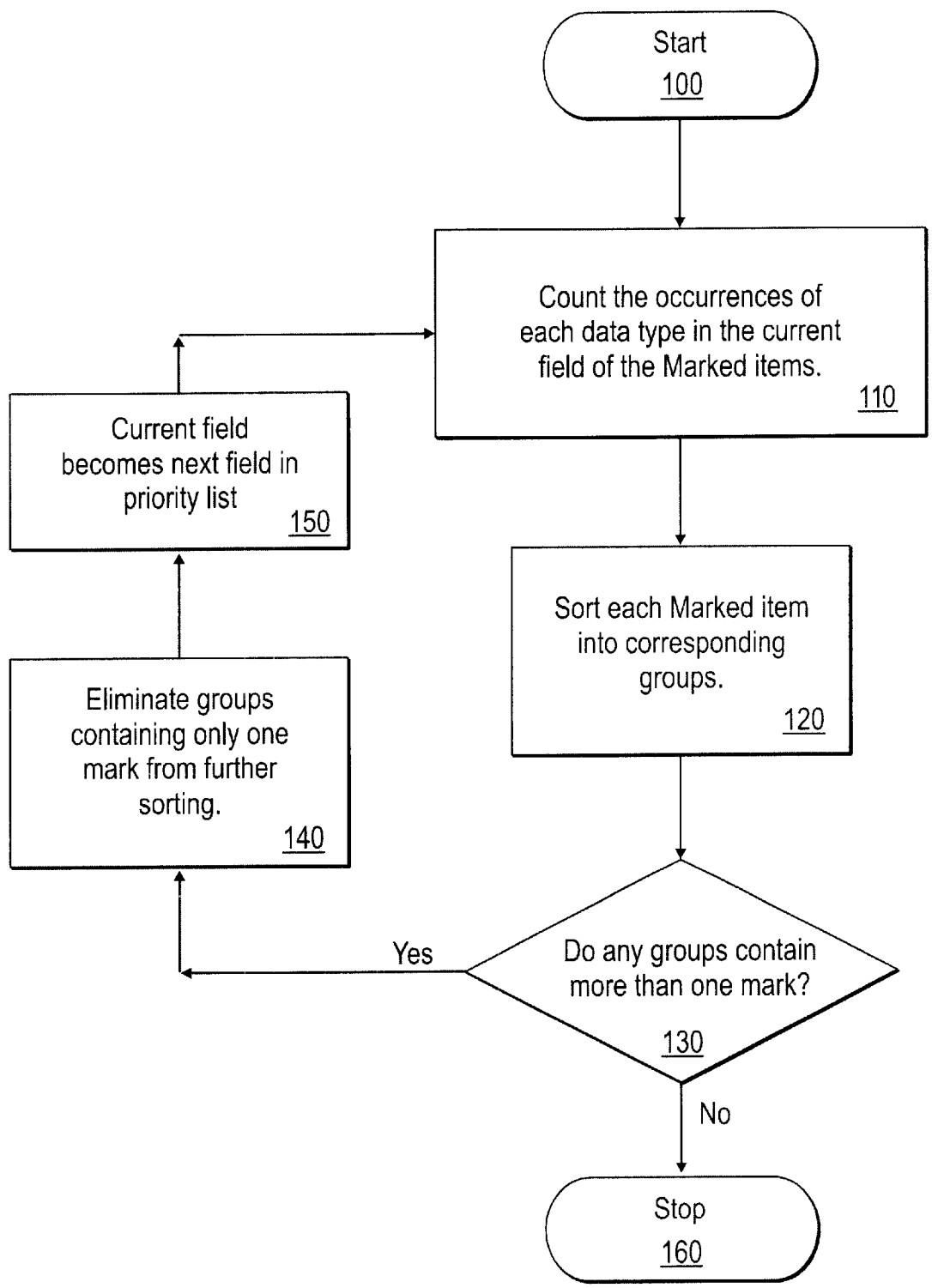
FIG. 1 is a flow diagram illustrating one embodiment of the present invention.

One embodiment of the process of the present invention is illustrated in FIG. 1. The process as illustrated in FIG. 1 assumes the existence of a set of data and some method of indexing into that set of data such that portions of the data can be marked. Each portion so marked can be thought of as a Marked item, and that which marks a Marked item can be thought of as a mark or marker. Also, a priority list indicates which portions of the Marked item should be utilized first, second, and so on in sorting the marked items. However, this priority list can be inherent in whatever is used to implement the method, such as using the character pointed to by a mark and then the characters following that pointed to by the mark until the sorting is completed. Furthermore, in general this method of sorting loosely requires that the data to be sorted have a finite and enumerated number of data types. Such a type could be the characters in the ASCII character set, or it could be something such as the months of the calendar year. To the extent that this requirement of types does not hold true, there is still a requirement that the data be somehow indexed.

At step 110, the occurrences of each data type in the current field of the Marked items is counted. At step 120, the Marked items are sorted into corresponding groups. There is one group for each data type that appears in the current field of the Marked items, and each Marked item having a particular data type in its current field is put in a group with all other Marked items having the same particular data type. At step 130 it is determined whether any groups contain more than one Marked item. If any groups do contain more than one Marked item, the method moves to step 140. At step 140, all groups containing only one Marked item are eliminated from further sorting.

In one embodiment, once a first Marked item is placed within a group, that first Marked item has been placed properly relative to the Marked items in other groups. A second group containing a second Marked item which comes before the first Marked item will only contain Marked items that come before the first Marked item. Likewise, a third group containing a third Marked item which comes after the first Marked item will only contain Marked items that come after the first Marked item. If the Marked item comes before or after a group, then it comes correspondingly before or after every Marked item within that group. Since this is true, once a Marked item has been placed in a group, it will not be moved out of that group, and that group will not be moved further up or down-in the sorted list. Therefore, any group having only one Marked item is necessarily completely sorted and need not be processed further.

Following step 140, the method proceeds to step 150, in which the current field that the method is focusing on for sorting purposes becomes the next field in the priority list. If text is being sorted, the next field is likely to be the next character in the sequence of characters pointed to by a given Marked item, such that the first step would utilize the character pointed to by a Marked item, and the succeeding steps would advance along that sequence of characters. Furthermore, this may be implicit in the implementation of the sorting method, it need not use an explicit list. If a database of records are being sorted, then the first field in a priority list might be the year of the date of the record, and succeeding fields might be the month, day, and time of day for the record in question. Alternatively,.the first field might be a surname, followed by a given name associated with each record.

After step 150, the method proceeds to step 110, but this time the next field in the priority list is used for counting purposes. Additionally, counting only occurs for those groups that are still being sorted, namely those groups that include two or more Marked items. After step 110, the method proceeds to step 120, where the Marked items still being sorted are placed into groups corresponding to the results of step 110. Note that this placement into groups does not affect any of the Marked items that are no longer being sorted, nor does it affect where the Marked items are in the sorted list relative to the Marked items no longer being sorted.

Finally, the method proceeds again to step 130. If there are still groups that include two or more Marked items, the method will proceed through the cycle again as often as necessary until no groups with more than one Marked item exist. However, if no groups contain more than one Marked item, then the method proceeds to step 160 and the Marked items have been sorted.

Figure 2:
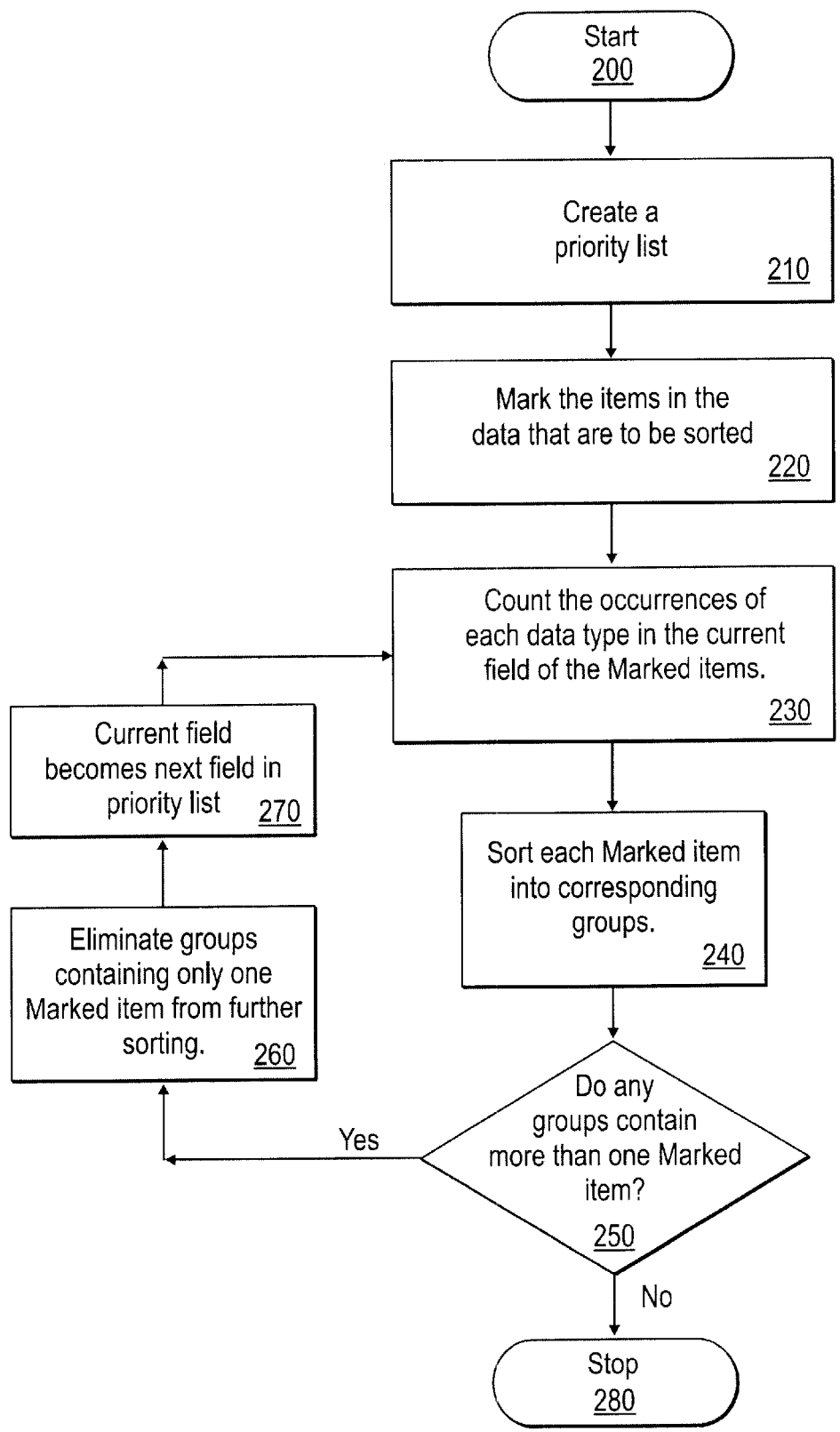
FIG. 2 is another flow diagram illustrating another embodiment of the present invention.

FIG. 2 illustrates an alternate embodiment of the invention. At step 210, a priority list is created. The priority list determines what relative importance different portions of the data have for sorting purposes. Step 210 might be inherent in the implementation of the method, it might involve some input from a user utilizing a computer system implementing the method, or it might involve some sort of analysis of the data to find fields suitable for purposes of sorting.

At step 220 the items within the data that are to be sorted are marked. This step could be implemented in a variety of ways. For instance, step 220 could involve a user placing marks within a document, such as marking phrases for inclusion in an index. Marking could involve marking every character in a document as would occur in a Burrows-Wheeler Transform. Step 220 could also include using a delimiter such as a space or return character to denote the beginning or end of a Marked item, or marking phonemes in a document identified in some form of speech recognition or synthesis. One having ordinary skill in the art will recognize that other methods for creation of priority lists and marking of items within data could be utilized within the spirit of the invention, including but not limited to implicitly marking portions of data and implicitly prioritizing data.

The process proceeds to steps 230, 240, and 250 which are similar to the counting, sorting, and determination steps discussed above with respect to FIG. 1. The outcome of step 250 may lead either to completion step 280 or it may lead to steps 260 and 270 (which are similar to steps 140 and 150 of FIG. 1).

Figure 3A:
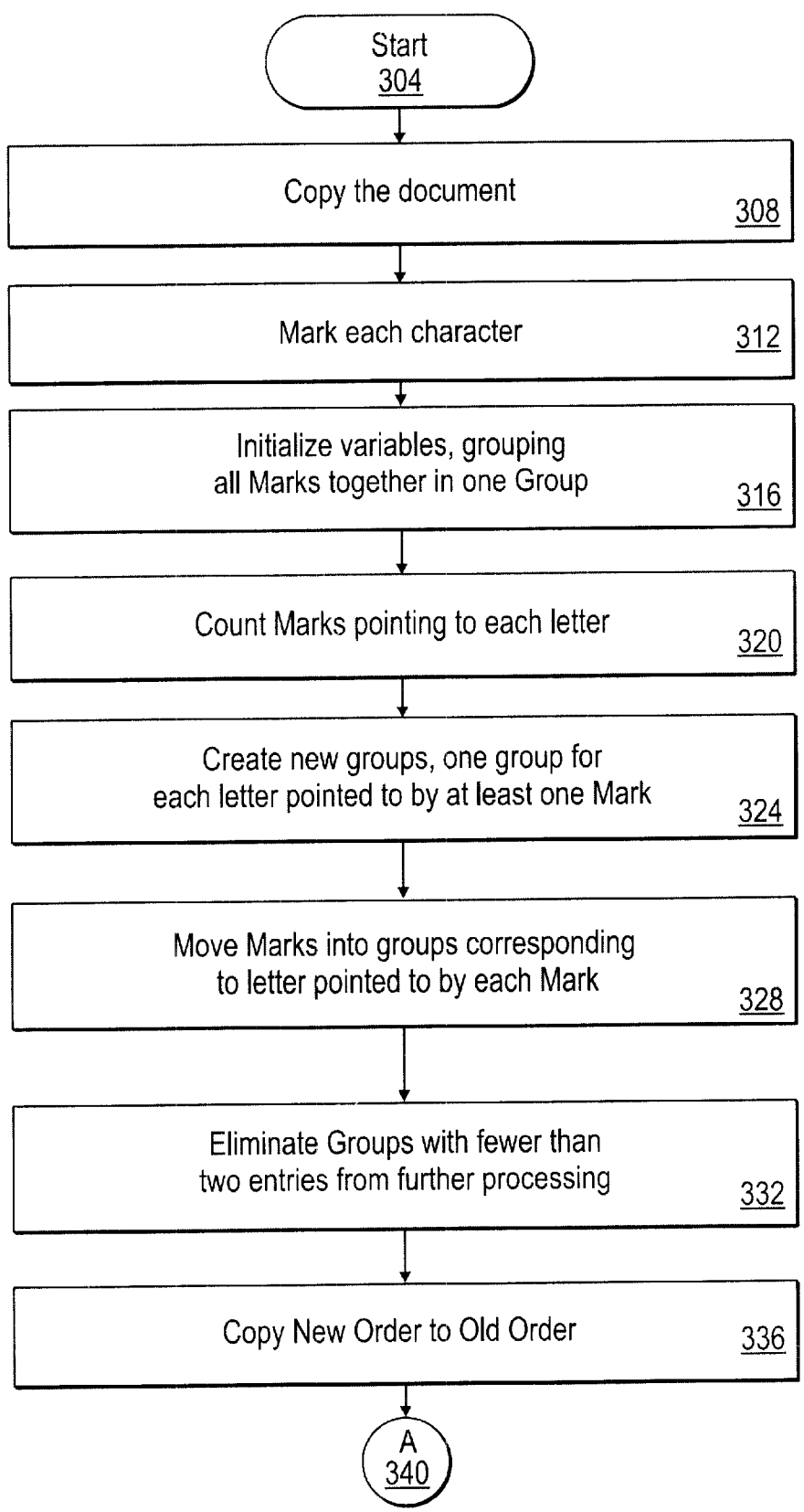
FIG. 3A is the first part of a third flow diagram illustrating another embodiment of the present invention.
Figures 3B, 3C:
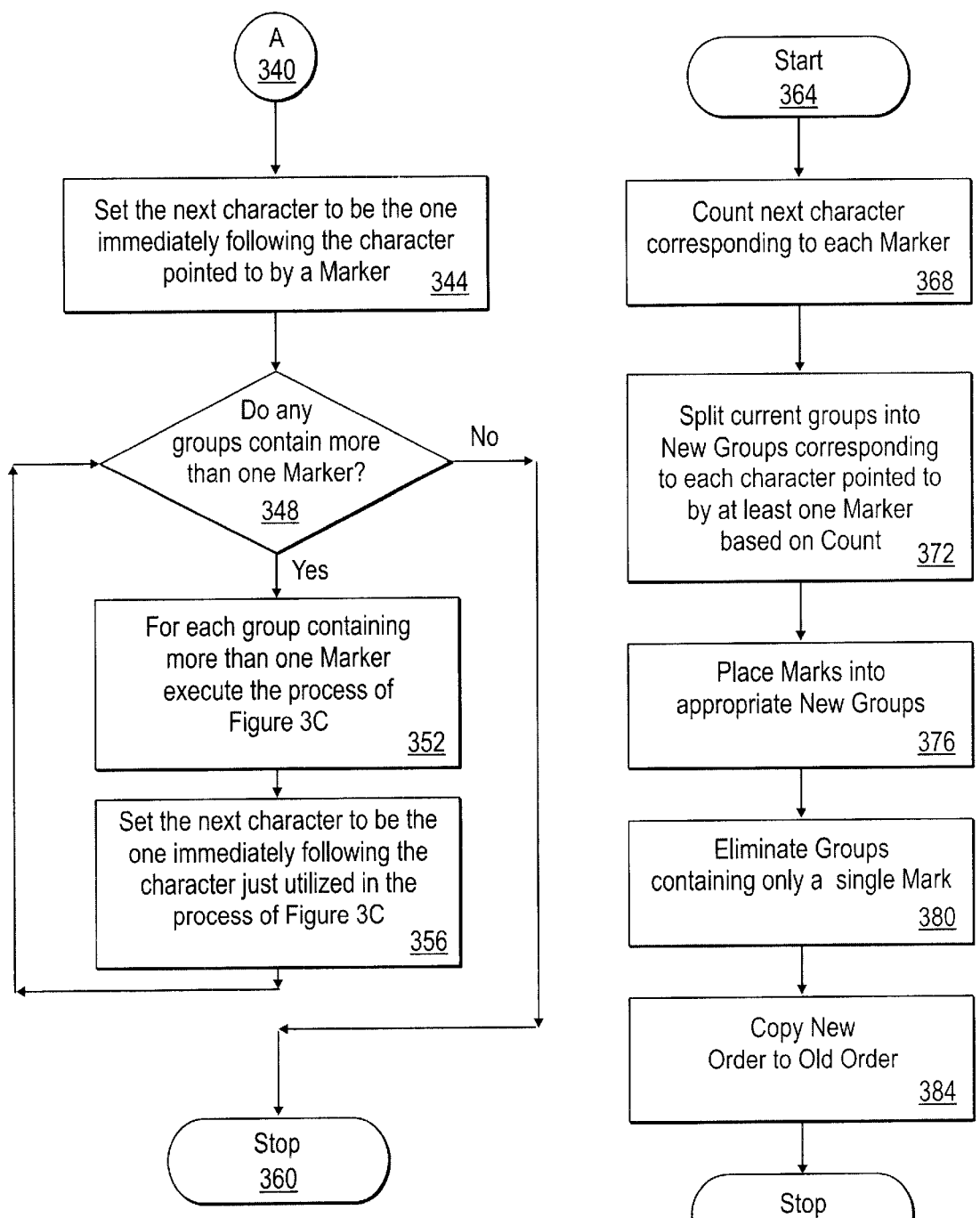
FIG. 3B is the second part of a third flow diagram illustrating another embodiment of the present invention.
FIG. 3C is the third part of a third flow diagram illustrating another embodiment of the present invention.

Turning now to FIGS. 3A, 3B, and 3C, these three figures collectively illustrate how the method may be applied to performing the Burrows-Wheeler transform. Such a transform is utilized in the application entitled "Method and Apparatus for Content Identification and Categorization of Textual Data", filed on the same day as this application and which is hereby incorporated by reference. For FIGS. 3A–3C, we assume use of a document composed of text utilizing N symbols.

FIG. 3A illustrates the initial portion of one embodiment of the method of applicant's invention. Following the initiation of the process step 304, the method proceeds to step 308, in which the document is copied for computational convenience with a code statement such as:

memcpy (Doc+L, Doc,L)

Note that step 308 is not absolutely necessary, as a copied document could be mimicked using methods well known to those skilled in the art.

At step 312, every character in the original document is marked, for in the Burrows-Wheeler Transform it is necessary to sort every character. Given a document of length L, a list of Marks would look like:

Mark[0], . . . Mark[M−1]

Mark[i]=i, for all i=0,1, . . . , (M=L)−1.

In general, not just for a Burrows-Wheeler Transform, Mark[i] would correspond to the with Marked item within the document in question.

After step 312, the method proceeds to step 316, where the Marks are all grouped into a single Group, the initial order is set to be the current order of the Marks, and the character to be compared is set to zero, for which code might look like:

NG=1

GrHead[0]=0

GrTail[0]=M order[i]=i, for all i k=0

Following step 316, the method proceeds to step 320, in which the number of Marks having as their first letter a given symbol or distinct value is counted. Code for such an operation might look like:

for(s=0;s<N;s++) Count[s]=0;

for(i=0;i<M;i++) Count[Doc[Mark[Order[i]]]]++;

After step 320, the method proceeds to step 324, in which the groups necessary to hold the Marks are created. Code for this operation might look like:

NewGrHead[0]=0; NewGrTail[N−1]=M;

for(s=1;s<N;s++)

NewGrHead[s]=NewGrTail[s−1]=NewGrHead[s−1]+ Count[s−1];

After step 324, the method proceeds to step 328, in which the Marks are moved into appropriate groups corresponding to the symbol pointed to by the marks. Code for this operation might look like:

```
for (s=0;s<N;s++) Count[s]=NewGrHead[s];
for (i=0;i<M;i++)
    NewOrder[Count[Doc[Mark[Order[i]]+k]]++]=Order
    [i];
```
Following step 328, the method proceeds to step 332, in which Groups that contain fewer than two Marks are eliminated from further sorting. Code for this operation might look like:

```
NG = 0;
for (s=0;s<N;s++) {
    if (NewGrTail[s]-NewGrHead[s]>1) {
        GrHead[NG] = NewGrHead[s];
        GrTail[NG++] = NewGrTail[s];
    }
}
```

Following step 332, the method proceeds to step 336, in which the new order is copied to the old one:

for (i=0;i<m;i++) Order[i]=NewOrder[i];

Following step 336, the method proceeds to step 340, which leads to FIG. 3B. FIG. 3B starts with step 340, and then proceeds to step 344, wherein the next character to be accessed at each Mark is set with code such as:

k++

Following step 344, the method proceeds to step 348, where it must be determined whether any groups still contain more than one Mark. If no such groups exist, then the method proceeds to completion step 360 and the document is sorted. If any such group exists, the method proceeds to step 352, which is further detailed in FIG. 3C below. After step 352, the method proceeds to step 356, also implemented with code such as:

k++

Following step 356, the method proceeds to step 348 again.

Turning to FIG. 3C, we have a process which implements many of the same steps illustrated in FIGS. 3A and 3B, without the initialization of the preceding Figures. The process starts at step 364 and then proceeds to step 368. Step 368 involves counting the kth character after the character pointed to by a given Mark in a manner similar to that employed in step 320. Code for step 368 might look like:

```
for (s=0;s<N;s++) Count[s]=0;
for (i=GrHead[g]; i<GrTail[g]; i++)
    Count[Doc[Mark[Order[i]]+k]]++;
```

Following step 368, the method then proceeds to step 372, wherein the current groups that are being processed are split into new groups according to the characters counted in step 368. Code for step 372 might look like:

```
NewGrHead[g][0]=GrHead[g];
NewGrTail[g][N-1]=GrTail[g];
for (s=1;s<N;s++)
    NewGrHead[g][s]=NewGrTail[g][s-1]=NewGrHead
        [g][s-1]+Count[s-1];
```

Following step 372, the method proceeds to step 376, in which the Marks are moved into appropriate new groups based on the results of step 368, similarly to the process employed in step 328. Code for such an operation, might look like:

```
for (s=0;s<N;s++) Count[s]=NewGrHead[g][s];
for(i=GrHead[g]; i<GrTail[g]; i++)
    NewOrder[Count[Doc[Mark[Order[i]]+k]]++]=Order
    [i]
```

Following step 376, the method proceeds to step 380 in which those groups that contain only a single Mark are eliminated from further processing. Step 380 closely resembles step 332, and code for it might look like:

```
i = 0;
for (g=0; g<NG; g++) {
    for (s=0;s<N;s++) {
        if (NewGrTail[g] [s]-NewGrHead[g] [s]>1) {
            GrHead[i] = NewGrHead[g] [s];
            GrTail[i++] = NewGrTail[g] [s];
        } } }
NG = i;
```

Following step 380, the method proceeds to step 384 in which the New Order is copied to the Old Order, which might involve code such as:

for(i=0; i<M; i++) order[i]=NewOrder[i];

After step 384, the method proceeds to completion step 388 and the process is completed. Since this is all executed as part of step 352, this would indicate that the method would then proceed to step 356 as explained earlier with reference to FIG. 3B.

Turning to FIGS. 4 and 5, both illustrate stages in the processing resulting from applying the general method of the embodiment disclosed by FIGS. 3A, 3B, and 3C to the sample at the top of FIG. 4. In this case, not every character of the document has been marked. Rather, nine marks (0-8) have been placed within the text, with the expectation that those nine marks would be sorted. This is illustrated at the top of FIG. 4 with the nine numerals pointing into the text. FIG. 4 illustrates the status of variables used in FIGS. 3A, 3B, and 3C, or the status of memory for such an implementation. FIG. 5 illustrates the order as it changes after each cycle of processing, and the last column of each table contains an 'X' for those entries that are still being sorted.

Note that in the example given, each Mark points to a certain character, but it should not be assumed that the item marked terminates at the next Mark. For instance, the item Marked by Mark 7 is "IVEN BEF . . ." even though 'V' is pointed to by Mark 8.

Turning to FIG. 4, at Step 0, the Order is initialized and all Marks are grouped in one Group, from Order position 0 to Order position 8. In FIG. 5, the table for Step 0 shows the Marks and text unsorted. At point 1-a of FIG. 4, each character in the sample is counted. At point 1-b, the groups are generated, the size of each group determined by the count from point 1-a. At point 1-c the New Order is determined by putting each Mark in the Group corresponding to the first letter pointed to by each Mark. Finally, the new Groups with more than one entry are shown in point 1-d. The order shown at point 1-c is illustrated in FIG. 5 in the Table corresponding to Step 1.

Turning to the 2-a sequence, at 2-a-0, the count for the Marks in the first group is shown. Here, it can be seen that each of the marks has a different second letter. At point 2-b-0, the new groups for the two marks are illustrated, and at point 2-c-0 the New Order resulting from this portion of the processing is displayed. Since the entry at Mark 1 came before the entry at Mark 7, they are not swapped. Similarly, the 2-b sequence shows the processing of the second group, which results in no changes in the New Order, but splitting of Mark 3 into a different group from Marks 4 and 5, as Mark 3 pointed to 'ME . . . ' and Marks 4 and 5 both point to "MP . . . ." Likewise, the 2-c sequence shows processing of the third and final group, but since both Marks 6 and 8 point to "VE . . ." no changes result. Point 2-d shows the updated groups, namely those that include more than one Mark. The table in FIG. 5 corresponding to Step 2 shows the order of the Marks after this processing.

Turning now to the sequence for the third time through the process, 3-c-0 shows the New Order after processing the first group, namely entries 3 and 4. Since both entries point to "MPL . . ." they do not switch locations. Likewise, 3-c-1 shows the New Order after processing the second group, wherein entries 8 and 6 did switch positions because entry 8 pointed to "VEN . . ." and entry 6 pointed to "VER . . . ." Line 3-d shows the current groups after this round of processing, and only the group of Marks 3 and 4 exists, since Mark 8 and Mark 6 now belong to different groups. Likewise, the portion of FIG. 5 corresponding to Step 3 shows the current order of the Marks and accompanying text.

Turning to line 4-c-0, the New Order does not change from that of line 3-c-1 with the next round of processing since both Marks 4 and 5 point to "MPLE . . . ." Likewise, line 4-d does not change from line 3-d because the two Marks still belong to the same group. In FIG. 5, the table corresponding to Step 4 shows that the order has not changed as well.

Finally, in step 5, at line 5-c-0, the New Order shows the final order, once the processing determines that Mark 5 points to "MPLES . . ." while Mark 4 points to "MPLE . . ." and in this sorting routine, a space such as that following the E in Mark 4 comes after a letter such as the 'S' in Mark 5. One skilled in the art will recognize that other methods of determining which letter should come first, or whether spaces come before or after letters could be used.

Figure 6:
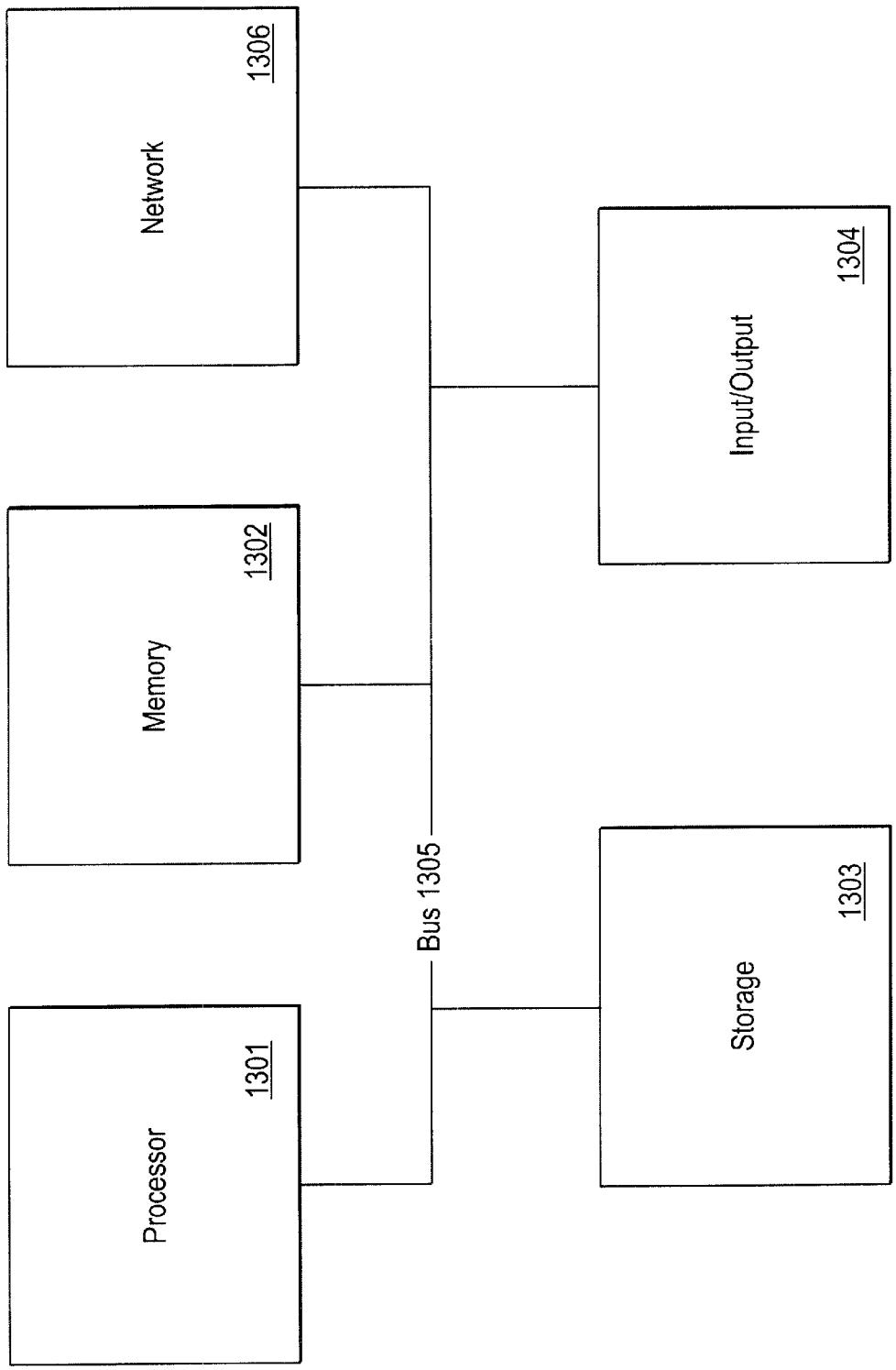
FIG. 6 is a diagram of a system suitable for implementation of the present invention.

FIG. 6 shows a system useful in performing the sorting involved in applicant's invention. The system includes processor 1301, Memory 1302, Storage Device 1303, Input/Output Device 1304, Bus 1305, and Network 1306. Note that the system need not have all of these components to function. In particular, it need not have storage device 1303 nor network 1306. Additionally, Input/Output Device 1304 can be split into an input device and an output device. Typically, the input device will be capable of reading machine readable media such as: magnetic disks, optical disks, carrier waves, magnetic tape, or documents (read optically).

As will be apparent to one skilled in the art, applicant's invention can be implemented as instructions on machine readable media, such as instructions in memory such as memory 1302 or other media such as transmission media, or as the logic of an application specific integrated circuit or programmable logic. In each of these cases, the implementation causes a machine, typically some form of processor, to execute the processes necessary to implement applicant's invention.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A computer-implemented method of sorting a text document, the text document composed of a sequence of characters, comprising:
   counting each character of the sequence of characters pointed to by a marker;
   sorting markers for each character into a set of groups, each group corresponding to a distinct value of the characters in the sequence of characters, the groups created based on the count of each distinct value of the characters in the sequence of characters;
   repeating for each group of the set of groups containing more than one marker, counting each character following the character previously counted for that marker, and sorting the markers within each group into further groups of the set of groups, each further group of the set of groups corresponding to a distinct value of the characters in the sequence of characters, each further group of the set of groups created based on the count of each distinct value of the characters in the sequence of characters, until no group contains more than one marker.

2. The computer-implemented method of claim 1 further comprising:
   copying the text document.

3. The computer-implemented method of claim 2 further comprising:
   marking the selected characters within the text document.

4. The computer-implemented method of claim 3 wherein marking selected characters within the text document comprises marking a first character of every word in the text document.

5. The computer-implemented method of claim 3 wherein marking selected characters within the text document comprises marking a first character of every phoneme in the text document.

6. The computer-implemented method of claim 3 wherein marking selected characters within the text document comprises marking every character in the text document.

7. A computer-implemented method of sorting textual data in a text document, comprising:
   marking a set of items within the document to be sorted, creating a mark corresponding to each marked item;
   initializing a set of groups of marks;
   counting the marks corresponding to each character in the text document;
   creating groups within the set of groups-of marks corresponding to each character in the text document;
   moving marks into groups corresponding to each character in the text document, each mark moved into a group corresponding to the character pointed to by the mark;
   eliminating groups with fewer than two marks from further sorting;
   copying the new order of marks corresponding to the marks as moved into groups;
   determining if any groups contain more than one mark; and
   if after said determining, a group contains more than-one mark, repeating said counting, creating, moving, eliminating, copying, and determining for all groups that contain more than one mark for the next character in the sequence corresponding to each mark.

8. A machine readable medium embodying instructions, the instructions when executed by a machine causing the machine to perform the method comprising:
   counting each character of the sequence of characters pointed to by a marker;
   sorting markers for each character into a set of groups, each group corresponding to a distinct value of the characters in the sequence of characters, the groups created based on the count of each distinct value of the characters in the sequence of characters;
   repeating for each group of the set of groups containing more than one marker, counting each character following the character previously counted for that marker, and sorting the markers within each group into further groups of the set of groups, each further group of the set of groups corresponding to a distinct value of the characters in the sequence of characters, each further group of the set of groups created based on the count of each distinct value of the characters in the sequence of characters, until no group contains more than one marker.

9. The machine readable medium of claim 8 wherein:

the method further comprises copying the text document.

10. The machine readable medium of claim 9 wherein:

the method further comprises marking selected characters within the text document.

11. The machine readable medium of claim 10 wherein:

marking selected characters within the text document comprises marking a first character of every word in the text document.

12. The machine readable medium of claim 10, wherein:

marking selected characters within the text document comprises marking a first character of every phoneme in the text document.

13. The machine readable medium of claim 10 wherein:

marking selected characters within the text document comprises marking every character in the text document.

14. A system comprising a processor and memory, said processor configured to count each character of the sequence of characters pointed to by a marker, sort markers for each character into a set of groups, each group corresponding to a distinct value of the characters in the sequence of characters, the groups created based on the count of each distinct value of the characters in the sequence of characters, and repeat for each group of the set of groups containing more than one marker: counting each character following the character previously counted for that marker and sorting the markers within each group into further groups of the set of groups, each further group of the set of groups corresponding to a distinct value of the characters in the sequence of characters, each further group of the set of groups created based on the count of each distinct value of the characters in the sequence of characters, until no group contains more than one marker.

15. The system of claim 14 wherein the processor further configured to:

copy the text document.

16. The system of claim 15 wherein the processor further configured to:

mark selected characters within the text document.

17. The system of claim 15 wherein the processor further configured to:

mark a first character of every word in the text document.

18. The system of claim 15 wherein the processor further configured to:

mark a first character of every phoneme in the text document.

19. The system of claim 15 wherein the processor further configured to:

mark every character in the text document.

\* \* \* \* \*